US010958568B2

(12) United States Patent
Hiltunen et al.

(10) Patent No.: US 10,958,568 B2
(45) Date of Patent: *Mar. 23, 2021

(54) TOPOLOGY AWARE LOAD BALANCING ENGINE

(71) Applicant: AT&T Intellectual Property I, L.P., Atlanta, GA (US)

(72) Inventors: Matti A. Hiltunen, Morristown, NJ (US); Richard D. Schlichting, New Providence, NJ (US); Kaustubh Joshi, Scotch Plains, NJ (US); Hiroya Matsuba, Tokyo (JP)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,717

(22) Filed: May 10, 2019

(65) Prior Publication Data

US 2019/0268264 A1 Aug. 29, 2019

Related U.S. Application Data

(63) Continuation of application No. 14/954,173, filed on Nov. 30, 2015, now Pat. No. 10,291,513.

(51) Int. Cl.
*H04L 12/721* (2013.01)
*H04L 12/26* (2006.01)
(Continued)

(52) U.S. Cl.
CPC .............. *H04L 45/38* (2013.01); *H04L 41/12* (2013.01); *H04L 43/045* (2013.01);
(Continued)

(58) Field of Classification Search
CPC ....... H04L 12/24; H04L 12/721; H04L 12/26; H04L 29/08; H04L 43/0817;
(Continued)

(56) References Cited

U.S. PATENT DOCUMENTS 6,578,066 B1 6/2003 Logan et al.
7,493,380 B2 2/2009 Aman et al.
(Continued)

OTHER PUBLICATIONS

Matsuba et al., "Airfoil: A Topology Aware Distributed Load Balancing Service," IEEE Cloud Conference, Jun. 27, 2015.
(Continued)

*Primary Examiner* — Benjamin M Thieu
(74) *Attorney, Agent, or Firm* — Hartman & Citrin LLC

(57) ABSTRACT

Concepts and technologies are disclosed herein for a topology aware load balancing engine. A processor that executes a load balancing engine can receive a request for a load balancing plan for an application. The processor can obtain network topology data that describes elements of a data center and links associated with the elements. The processor can obtain an application flow graph associated with the application and create a load balancing plan to use in balancing traffic associated with the application. The processor can create the load balancing plan to use in balancing traffic associated with the application and distribute commands to the data center to balance traffic over the links.

20 Claims, 5 Drawing Sheets

(51) Int. Cl.
*H04L 12/24* (2006.01)
*H04L 29/08* (2006.01)

(52) U.S. Cl.
CPC ...... *H04L 43/0817* (2013.01); *H04L 43/0882* (2013.01); *H04L 67/1008* (2013.01)

(58) Field of Classification Search
CPC . H04L 43/0882; H04L 41/12; H04L 67/1002; H04L 43/045; H04L 45/38
See application file for complete search history.

(56) References Cited

U.S. PATENT DOCUMENTS

| | | |
|---|---|---|
| 7,571,470 B2 | 8/2009 | Arregoces et al. |
| 7,609,619 B2 | 10/2009 | Naseh et al. |
| 7,729,350 B2 | 6/2010 | Singh et al. |
| 7,769,886 B2 | 8/2010 | Naseh et al. |
| 7,894,372 B2 | 2/2011 | Chu et al. |
| 8,160,063 B2 | 4/2012 | Maltz et al. |
| 8,412,810 B1 | 4/2013 | Tompkins |
| 9,049,131 B2 | 6/2015 | Liu et al. |
| 9,888,063 B2 | 2/2018 | Fitzpatrick |
| 9,912,742 B2 | 3/2018 | Fitzpatrick |
| 2006/0268742 A1 | 11/2006 | Chu |
| 2012/0163164 A1 | 6/2012 | Terry et al. |
| 2012/0243403 A1 | 9/2012 | Hu et al. |
| 2013/0124712 A1 | 5/2013 | Parker |
| 2013/0232240 A1 | 9/2013 | Purusothaman |
| 2014/0280499 A1 | 9/2014 | Basavaiah |
| 2015/0103837 A1 | 4/2015 | Dutta |
| 2015/0117216 A1 | 4/2015 | Anand et al. |
| 2015/0124622 A1 | 5/2015 | Kovvali et al. |
| 2015/0163159 A1* | 6/2015 | DeCusatis ............ H04L 47/805 709/226 |
| 2015/0281314 A1 | 10/2015 | Bragstad |
| 2016/0164787 A1 | 6/2016 | Roach |
| 2016/0173373 A1 | 6/2016 | Guichard |
| 2016/0314175 A1* | 10/2016 | Dhayapule ........... H04L 47/125 |
| 2016/0337223 A1* | 11/2016 | Mackay ................. H04L 43/16 |
| 2016/0381133 A1 | 12/2016 | Palavalli |
| 2017/0099210 A1 | 4/2017 | Fardid |
| 2017/0111230 A1 | 4/2017 | Srinivasan |

OTHER PUBLICATIONS

U.S. Office Action dated Nov. 1, 2017 in U.S. Appl. No. 14/954,173.
U.S. Office Action dated May 25, 2018 in U.S. Appl. No. 14/954,173.
U.S. Notice of Allowance dated Dec. 17, 2018 in U.S. Appl. No. 14/954,173.

* cited by examiner

TOPOLOGY AWARE LOAD BALANCING ENGINE

CROSS-REFERENCE TO RELATED APPLICATIONS

This application is a continuation of and claims priority to U.S. patent application Ser. No. 14/954,173, entitled "Topology Aware Load Balancing Engine," filed Nov. 30, 2015, now U.S. Pat. No. 10,291,513, which is incorporated herein by reference in its entirety.

BACKGROUND

A recent move in networking has been to the use of cloud technologies. According to some cloud technologies, virtualization of certain types of network functionality such as applications, services, and the like, is used to replace traditional hardware and software. In some virtualized networks, commercial-off-the-shelf ("COTS") hardware can be used to host virtual machines that can execute software to provide functionality associated with certain applications or services. Thus, specialized hardware and software can be replaced by generic hardware that can execute specialized software modules.

One advantage of cloud technologies over traditional networking technologies is the ability to elastically increase and/or decrease capacity based upon demand. Because hardware does not have to be deployed to meet demand spikes and/or to reduce capacity when demand dips, the cloud technologies can allow nearly instantaneous changes in capacity. Additionally, redundancy may be used to increase the reliability of services. Because hardware does not have to be deployed to provide redundancy, multiple versions of the same virtual machine may operate on other hardware at any given time.

Because of the shifts in demand and/or redundancy requirements, several instances of virtual machines may run at any given time. Thus, if one virtual machine fails or is compromised, the overall service may not be impacted. One downside, however, is that requests may be routed to a virtual machine without regard to various considerations such as location, cost, etc. Furthermore, providing several instances of virtual machines may increase complexity needed to place and/or control applications and/or to route traffic associated with applications because multiple instances of a particular virtual machine may exist at any given time.

SUMMARY

The present disclosure is directed to a topology aware load balancing engine. In some embodiments, a server computer can execute a topology aware load balancing engine. The server computer can receive a request to create a load balancing plan ("load balancing request") from a requestor. The server computer can analyze the load balancing request and based on the analysis, the server computer can determine a load balancing plan for an application that is (or is to be) deployed at a data center. As illustrated and described herein, the server computer can, by way of executing the topology aware load balancing engine, determine an optimal load balancing plan for the application across one or more data center and/or optimize the various links of the data center to minimize utilization of one or more of the links while meeting the application requirements of the application.

In particular, the topology aware load balancing engine can analyze one or more data centers that may host an application or a component thereof. Thus, the topology aware load balancing engine can analyze the one or more data centers to determine a load balancing plan of the application and/or application components in the data center(s). Within the data center, the topology aware load balancing engine can select a first server (or other element of the resources) that can provide the functionality of the application or a component thereof. The topology aware load balancing engine can identify links and capacities associated with the server selected and compare application flow requirements to the available links. The topology aware load balancing engine can perform this analysis for each available server (or other element) in the data center that can provide functionality associated with the application, and/or the links associated with those servers and/or data centers.

Upon determining links and capacities for the available servers in a data center, the topology aware load balancing engine can consider all of the links that will be used to provide the application holistically. The server computer can minimize utilization of one or more of the links (e.g., a highest utilized link) to identify an optimal load balancing plan for the application. Thus, the topology aware load balancing engine can determine what links of the data center will be used to provide functionality associated with the application and/or what load balancing plan of the application will result in a minimized load across the highest utilized link in the data center, or what load balancing plan for the application will result in the lowest total utilization of the links associated with the data centers.

When the optimal resources (e.g., links) are identified, the topology aware load balancing engine can output the load balancing plan and generate one or more commands to deploy or redeploy the application to the links that result in the lowest utilization of the links. Thus, the topology aware load balancing engine can minimize one or more link utilizations and/or capacities to identify an optimal load balancing plan for the application. After determining the optimal load balancing plan for the application, the topology aware load balancing engine can also be configured to adjust and/or restrict flows associated with the application based upon load balancing at runtime. Thus, the topology aware load balancing engine can again minimize one or more utilizations of the one or more links associated with the application and re-distribute commands to the data centers to move the application and/or to adjust execution of the application in a manner that will optimize link usage associated with the application pre-distribution and/or post-distribution. These and other aspects of the concepts and technologies described herein will be illustrated and described below in more detail.

According to one aspect of the concepts and technologies disclosed herein, a method is disclosed. The method can include receiving, at a processor that executes a topology aware load balancing engine, a request for a load balancing plan for an application. The processor can obtain network topology data that describes elements of a data center and links associated with the elements and an application flow graph associated with the application. The processor can create a load balancing plan to use in balancing traffic associated with the application. The processor also can distribute commands to the data center to balance traffic over the links. The load balancing plan can minimize a utilization of one or more links associated with the application, in some embodiments.

In some embodiments, creating the load balancing plan can include identifying a number of server links associated with the data center, determining an application flow requirement for the server links, minimizing a capacity associated with a highest utilized server link of the number of server links while meeting the application flow requirement, and generating the commands based on the capacity. In some embodiments, minimizing the capacity can include setting a parameter that represents a utilization of the highest utilized server link, minimizing the parameter, and generating the commands based on the minimizing.

In some embodiments, the application flow graph can represent the links used by the application. In some embodiments, the network topology data can include location data that identifies a location of a server associated with the data center, an availability associated with the server, and a capacity of the server. In some embodiments, the network topology data can identify the link, location data that identifies a location of the link, and an availability associated with the link. In some embodiments, the network topology data can represent a volume of requests associated with the data center, and creating the load balancing plan can include balancing the volume of requests across multiple tiers of the data center.

According to another aspect of the concepts and technologies disclosed herein, a system is disclosed. The system can include a processor and a memory. The memory can store computer-executable instructions that, when executed by the processor, cause the processor to perform operations. The operations can include receiving a request for a load balancing plan for an application, obtaining network topology data that describes elements of a data center and links associated with the elements, obtaining an application flow graph associated with the application, creating a load balancing plan to use in balancing traffic associated with the application, and distributing commands to the data center to balance traffic over the links. The load balancing plan can minimize a utilization of one or more links associated with the application, in some embodiments.

In some embodiments, creating the load balancing plan can include identifying a number of server links associated with the data center, determining an application flow requirement for a highest utilized server link of the number of server links, minimizing a capacity associated with the highest utilized server link of the number of server links, and generating the commands based on the capacity. In some embodiments, minimizing the capacity can include setting a parameter that represents a utilization of the highest utilized server link of the number of server links, minimizing the parameter, and generating the commands based on the minimizing.

In some embodiments, the application flow graph can represent the links used by the application. In some embodiments, the network topology data can include location data that identifies a location of the link, and an availability associated with the link. In some embodiments, the network topology data can represent a volume of requests associated with the data center, and creating the resource allocation plan can include balancing the volume of requests across multiple tiers of the data center. In some embodiments, the network topology data can describe a capacity of the link.

According to yet another aspect of the concepts and technologies disclosed herein, a computer storage medium is disclosed. The computer storage medium can have computer-executable instructions stored thereon. When the computer-executable instructions are executed by a processor, the processor can perform operations. The operations can include receiving a request for a load balancing plan for an application, obtaining network topology data that describes elements of a data center and links associated with the elements, obtaining an application flow graph associated with the application, creating a load balancing plan to use in balancing traffic associated with the application, and distributing commands to the data center to balance traffic over the links. The load balancing plan can minimize one or more utilization of one or more link associated with the application.

In some embodiments, creating the load balancing plan can include identifying a number of server links associated with the data center, determining an application flow requirement for a highest utilized server link of the number of server links, minimizing a capacity associated with the highest utilized server link of the number of server links, and generating the commands based on the capacity. In some embodiments, adjusting the resource allocation plan can include setting a parameter that represents a utilization of the highest utilized server link of the number of server links, minimizing the parameter, and generating the commands based on the minimizing.

In some embodiments, the application flow graph can represent the links used by the application. In some embodiments, the network topology data can include location data that identifies a location of the link, and an availability associated with the link. In some embodiments, the network topology data can represent a volume of requests associated with the data center, and creating the resource allocation plan can include balancing the volume of requests across multiple tiers of the data center. In some embodiments, the network topology data can describe a capacity of the link.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
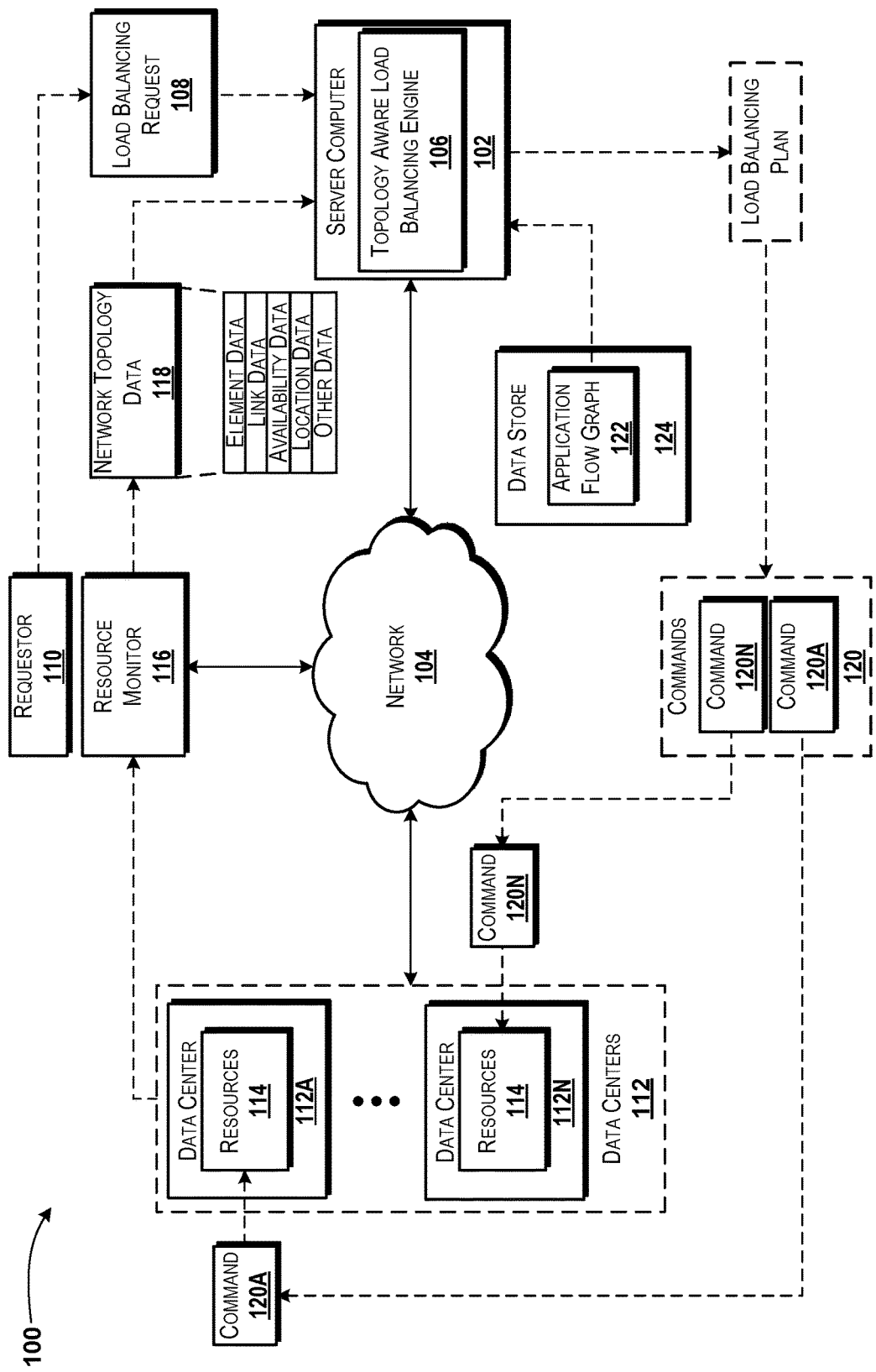
FIG. 1 is a system diagram illustrating an illustrative operating environment for various embodiments of the concepts and technologies described herein.

The following detailed description is directed to a topology aware load balancing engine. The topology aware load balancing engine can analyze one or more data centers that may host an application or a component thereof. Thus, the topology aware load balancing engine can analyze the one or more data centers to determine a load balancing plan for an application and/or application components in the data center(s). Within the data center, the topology aware load balancing engine can select a first server (or other element of the resources) that can provide the functionality of the application. The topology aware load balancing engine can identify links and capacities associated with the server selected and compare application flow requirements to the available links.

The topology aware load balancing engine can perform this analysis for each available server (or other element) in the data center that can provide functionality associated with the application, and/or the links associated with those servers. Upon determining links and capacities for the available servers in a data center, the topology aware load balancing engine can minimize one or more utilization of one or more link that will (or does) provide the application to identify an optimal load balancing plan for the application and/or to balance requests among the various links. Thus, the topology aware load balancing engine can determine which load balancing approach for the application (e.g., on which of the resources) will result in the lowest total utilization of links to/from the analyzed resources.

When the optimal resource is identified, the topology aware load balancing engine can output one or more commands to deploy the load balancing plan to the element(s) that results in the lowest total utilization of the links. Thus, the topology aware load balancing engine can minimize one or more link utilization and/or link capacity to balance load for the application. The topology aware load balancing engine can also be configured to adjust and/or restrict the allocation plan for the application based upon load balancing. Thus, the topology aware load balancing engine can again minimize one or more utilization of the one or more link associated with the application and re-distribute commands to the data centers to move the application and/or to adjust execution of the application in a manner that will optimize the application pre-distribution and/or post-distribution.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and using a topology aware load balancing engine will be described, according to an illustrative embodiment. The operating environment 100 shown in FIG. 1 includes a server computer 102. According to various embodiments, the server computer 102 can operate in communication with and/or as part of a communications network ("network") 104.

According to various embodiments, the functionality of the server computer 102 may be provided by one or more server computers, desktop computers, laptop computers, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is described herein as a server computer. It should be understood that this embodiment is illustrative, and should not be construed as being limiting in any way.

The server computer 102 can execute an operating system (not shown in FIG. 1) and one or more application programs such as, for example, a topology aware load balancing engine 106. The operating system can include a computer program that can control the operation of the server computer 102. The topology aware load balancing engine 106 can include an executable application configured to execute on top of the operating system to provide various functions illustrated and described herein for performing load balancing with an awareness of topology and application flow requirements.

In particular, the topology aware load balancing engine 106 can be configured to obtain a request for a load balancing plan ("load balancing request") 108. The load balancing request 108 can be received or otherwise obtained by the server computer 102. In some embodiments, for example, the topology aware load balancing engine 106 can receive the load balancing request 108 from a requestor 110. The requestor 110 can include almost any entity. For example, according to various embodiments the requestor 110 can correspond to an application, a service, an entity, a network operator, combinations thereof, or the like. Thus, a network operator, for example, can generate a command or request to create a load balancing plan and/or to balance load associated with an application for a particular purpose or need. It should be understood that this example is illustrative and therefore should not be construed as being limiting in any way.

It should be understood that while the load balancing request 108 is illustrated in FIG. 1 as being received by the server computer 102 from the requestor 110, in some embodiments an entity can interact with one or more user interface provided by the topology aware load balancing engine 106 (e.g., a web portal or the like) to create a command for and/or to request balancing of a load associated with an application. As such, the load balancing request 108 can essentially be created at the server computer 102 instead of being "received" by the server computer 102. Thus, the illustrated embodiment should be understood as being illustrative of one contemplated embodiment and should not be construed as being limiting in any way.

The topology aware load balancing engine 106 can analyze the load balancing request 108 and determine, based upon the load balancing request 108, an application for which the load balancing is requested by way of the load balancing request 108. Thus, for example, the topology aware load balancing engine 106 can determine, based upon the load balancing request 108, what application or service will be balanced. As will be explained in more detail below, the topology aware load balancing engine 106 can determine the application from the load balancing request 108 in various manners.

The operating environment 100 also can include one or more data centers 112A-N (hereinafter collectively and/or generically referred to as "data centers 112"). The data centers 112 can host one or more resources 114. The resources 114 can include various types of computing resources, storage resources, transport resources, and/or other resources such as orchestration resources, monitoring resources, reporting resources, control resources, combinations thereof, or the like. According to various embodiments of the concepts and technologies described herein, the data centers 112 also can include load balancing agents that can balance load across links in the data centers 112 and/or perform other load balancing tasks. In various embodiments, the load balancing agents can be instructed by the topology aware load balancing engine 106 when a load balancing plan is formulated. It should be understood that this example is illustrative and therefore should not be construed as being limiting in any way.

In various embodiments of the concepts and technologies described herein, the operating environment 100 can include a resource monitor 118. The resource monitor 118 can be included in the data centers 112 and/or can be provided as a standalone component. For purposes of illustration, FIG. 1 illustrates the resource monitor 118 operating outside of the data centers 112. It should be understood that this example is illustrative and therefore should not be construed as being limiting in any way.

The resource monitor 118 can be configured to determine a network topology of one or more of the data centers 112 at various times. In some embodiments, the resource monitor 118 can capture the network topology of each data center 112 at regular time intervals, when updates are detected, in response to various triggers, and/or at other times. Thus, the resource monitor 118 can maintain an up-to-date network topology of the one or more data centers 112. It should be understood that this example is illustrative and therefore should not be construed as being limiting in any way.

The resource monitor 118 can generate network topology data 116, which can describe the network topology at any particular time. The resource monitor 118 can be configured to monitor and/or analyze activity associated with data centers 112 to identify available data centers 112 that are capable of hosting resources 114 that can provide the requested needs and/or functions of the load balancing requested by way of the load balancing request 108. In some other embodiments, the data centers 112 can be configured to generate the network topology data 116 and/or provide the network topology data 116 to the server computer 102. In yet other embodiments, the server computer 102 can be configured to monitor the data centers 112 and/or generate the network topology data 116. Because other entities can generate the network topology data 116, it should be understood that these examples are illustrative and therefore should not be construed as being limiting in any way.

When generating the network topology data 116, the resource monitor 118 and/or other entity can identify each element of the data centers 112 (and/or their resources 114), utilizations of these elements and/or components thereof, capacities of these elements and/or components thereof, links between the elements (e.g., ports, communication paths, and the like), and/or other capabilities, capacities, utilizations, and/or loads associated with the data centers 112 and/or their resources 114 at various times. Thus, for example, these and/or other data points can be determined and/or collected at intervals of one or more milliseconds, one or more seconds, one or more minutes, one or more hours, one or more days, or the like. It can be appreciated that various time intervals may be chosen and/or used based upon fluctuation of these data points and/or a frequency with which the network topology data 116 is expected to be used by the topology aware load balancing engine 106. Also, as noted above, various triggers or requests can prompt updating of the network topology data 116 such as detected changes in the data centers 112, requests for updates, combinations thereof, or the like. It should be understood that these examples are illustrative and therefore should not be construed as being limiting in any way.

According to various embodiments, as shown in FIG. 1, the network topology data 116 can include element data, link data, availability data, location data, and/or other data, which are explained in more detail below. These data and/or other types of information included in the network topology data 116 can be analyzed by the topology aware load balancing engine 106 to identify resources 114 of the data centers 112 that provide functionality associated with an application for which load balancing is being requested by way of the load balancing request 108, and to craft a load balancing plan based upon these and/or other determinations.

The element data can include data describing elements of the data center 112 and/or elements included in the resources 114. Thus, for example, the element data can identify and/or describe computer servers, processing components, memory and/or other data storage components, routers, switches, racks, power sources and/or supplies, data connections and/or media, combinations thereof, or the like. The element data can also indicate capacities and/or capabilities of the various elements. Thus, the element data can identify elements such as a server computer and its processing and data storage capabilities (e.g., a processor and a memory) and define capacities and/or capabilities of the server computer, the processing unit, the data storage unit, and/or other aspects of the elements.

In one contemplated embodiment, the element data can identify a processing unit and its capabilities in terms of cycles per second, a data storage element and its capabilities in terms of read/write speed and or total storage capacity (e.g., in megabytes), and the like. Because the element data can describe additional and/or alternative types of elements of the data center 112 and/or the resources 114, it should be understood that these examples are illustrative and therefore should not be construed as being limiting in any way.

The link data can describe one or more data and/or networking links associated with the data center 112 and/or the resources 114. The link data therefore can describe throughput and/or bandwidth capabilities of the links, anticipated demand and/or fluctuations in demand, availability information, combinations thereof, or the like. The link data also can define, for each link, incoming and/or outgoing capacity, which can be dependent upon upstream and/or downstream elements and therefore may not otherwise be known. Because the link data can describe additional and/or alternative aspects of data links associated with the data centers 112 and/or the resources 114, it should be understood that these examples are illustrative and therefore should not be construed as being limiting in any way.

The availability data can describe availability of any elements and/or links associated with the data center 112 and/or the resources 114. Thus, the availability data can describe when elements and/or links are and/or are not available, fluctuations in availability, and the like. Thus, the availability data may indicate, for example, that a certain link is available at a particular capacity and/or that the capacity of the link is decreased at certain times due to fluctuations in demand. Because the availability data can describe additional and/or alternative aspects of demand for elements and/or links of a data center 112 and/or resources 114, it should be understood that these examples are illustrative and therefore should not be construed as being limiting in any way.

The location data can describe geographic locations associated with elements and/or links associated with the data center 112 and/or the resources 114. Thus, the location data can describe a geographic location at which an element is located and/or geographic locations through which links pass (and/or geographic locations of elements that provide the links). The location data may be useful to anticipate problems with elements and/or links in the event of outages, demand spikes, or the like, on application execution. For example, if a link is located in Miami, Fla., and a large sporting event or other type of event that is anticipated to require a great deal of network resources is planned for the area, the location data may be used to determine that a link and/or element in that location may be unreliable. This is merely one example of the concepts and technologies described herein and should not be construed as being limiting in any way. Because the location data can describe location data for any resources 114, the above examples should be understood as being illustrative.

The other data can describe any other information associated with the resources 114 and/or the data centers 112. The other data therefore can include any information that may affect the resources 114 and/or the data centers 112 such as, for example, age of equipment, ownership, manufacturer, chipset information, operating time and/or expected life, operating system information, processor speed and/or memory information, combinations thereof, or the like. The other data also can include information that identifies a volume of requests being handled by a particular element (e.g., a server or server link) of the data centers 112. As will be explained in more detail below, this information can be used to ensure that groups of servers in multiple tiers of the data center 112 have an equal volume of requests being handled. In particular, some embodiments of the concepts and technologies described herein can be used to ensure that a network utilization associated with one group of servers does not exceed the network utilization of a higher tier of servers. It should be understood that this example is illustrative and therefore should not be construed as being limiting in any way.

Thus, the other data can be used to determine availability and/or performance (or expected availability and/or performance) of various elements and/or links of the data centers 112 and/or resources 114, as well as network utilization and/or balancing of load between tiers of a data center 112. Because the other data can include any other information as illustrated and described herein with respect to the network topology data 116, it should be understood that these examples are illustrative and therefore should not be construed as being limiting in any way.

Based on the network topology data 116, the topology aware load balancing engine 106 can determine the current availability of the resources 114 of one or more of the data centers 112. The availability can include an availability of computing resources, storage resources, and/or transport resources. Also, the topology aware load balancing engine 106 can know and/or determine performance limitations of the resources 114, and these limitations can be considered in determining the availability of those resources 114. Thus, for example, the topology aware load balancing engine 106 can know and/or determine performance limitations of servers (included in the resources 114) and/or components thereof and express upper limits of these performance limitations as linear functions.

In one contemplated example, a server may receive and forward input data to another server. Thus, if the server has sufficient memory and processing capabilities to perform these operations (receive and forward), the performance limitation of the server for this function can be the smallest of the maximum bandwidth of the incoming networking interface or the maximum bandwidth of the outgoing networking interface. It should be understood that this example is illustrative and therefore should not be construed as being limiting in any way.

The topology aware load balancing engine 106 can analyze the load balancing request 108 to identify an application for which load balancing is requested by way of the load balancing request 108. The topology aware load balancing engine 106 can obtain an application flow graph 122 associated with the application from a data storage device such as the data store 124. The functionality of the data store 124 can be provided by one or more server computers, desktop computers, memory devices, databases or other data structures, other computing systems, and the like. In the illustrated embodiments, the functionality of the data store 124 is provided by a server computer that hosts or stores one or more application flow graphs 122. It should be understood that this example is illustrative and therefore should not be construed as being limiting in any way.

The application flow graph 122 can define an application structure for an application. Thus, by determining the application for which load balancing is requested by way of the load balancing request 108, and by obtaining and analyzing the application flow graph 122 associated with the application determined, the topology aware load balancing engine 106 can determine what resources 114 the application uses and/or needs. The topology aware load balancing engine 106 therefore can determine, based upon the load balancing request 108 and the application flow graph 122, needs of the application including virtual machines, virtual machine components (e.g., network and/or service functions), links needed to support the application, bandwidths of connections to and from the virtual machines and/or functions, processing capabilities needed for the application, memory capabilities needed for the application, redundancy requirements for the applications, anticipated demand and/or fluctuations in demand for the application, combinations thereof, or the like.

These and other aspects of the application can be determined by the topology aware load balancing engine 106 based upon information included in the load balancing request 108 and/or the application flow graph 122. Because additional and/or alternative needs of the application can be determined by the topology aware load balancing engine 106, it should be understood that these examples are illustrative and therefore should not be construed as being limiting in any way.

In some embodiments, the application flow graph 122 can include a data structure. The data structure can include data points such as parameters, flags, fields, headers, or the like. These data points can specify almost any aspect of the application. Thus, the application flow graph 122 can define resources that are involved in execution of the application, communications and/or flows of data between those elements, bandwidth and/or capacity requirements for the flows and/or elements involved in the application, combinations thereof, or the like. Thus, the application flow graph 122 can indicate a structure of the application for which load balancing is requested by way of the load balancing request 108 including, but not limited to, a number of servers (and/or components thereof) involved in the application, how the servers (and/or components thereof) communicate with one another, a ratio between the amount of incoming/outgoing data for the servers (and/or components thereof), link capacities between elements to support the application, combinations thereof, or the like. Because the structure of the application may include additional and/or alternative information, some of which have been explained above, it should be understood that these examples are illustrative and therefore should not be construed as being limiting in any way.

In some embodiments, the server computer 102 (or the topology aware load balancing engine 106 executed thereby) can analyze the application flow graph 122 and the network topology data 116. The topology aware load balancing engine 106 therefore can determine, based upon the application flow graph 122, needs of the application as explained above, and the topology aware load balancing engine 106 also can determine, based upon the network topology data 116, the network topology. Based upon knowledge of the network topology and the needs of the application, the topology aware load balancing engine 106 can identify links and link capacities of the data centers 112 that host and/or are capable of hosting the application. The topology aware load balancing engine 106 also can determine a load balancing plan for the application. The load balancing plan can define how the application data flows will be spread across specific resources 114 of the data centers 112, as will be explained in more detail below.

To determine the load balancing plan, the topology aware load balancing engine 106 can obtain the network topology data 116 and an application flow graph 122. As noted above, the application flow graph 122 can be identified by the topology aware load balancing engine 106 based upon an identity of the application for which load balancing is requested by way of a load balancing request 108. Of course, the topology aware load balancing engine 106 can identify an appropriate application flow graph 122 based upon additional and/or alternative considerations, and as such, the example of identifying the application flow graph 122 based upon the load balancing request 108 should not be construed as being limiting in any way.

Based on the network topology data 116 and the application flow graph 122, the topology aware load balancing engine 106 can map links and/or data flows that are needed to support the application (as identified based on analyzing the application flow graph 122) to available network elements and/or flows (as identified based on analyzing the network topology data 116). According to various embodiments of the concepts and technologies described herein, the topology aware load balancing engine 106 may identify one or more sets of resources 114 that provide the functionality associated with the application. As such, various embodiments of the concepts and technologies described herein can be provided to enable the topology aware load balancing engine 106 to identify an optimized traffic flow scheme for the application on the resources 114 based on further analysis.

In particular, the topology aware load balancing engine 106 can analyze a data center 112. The analyzed data center 112 can be an only available data center 112 or one or multiple available data centers 112. Regardless, the topology aware load balancing engine 106 can analyze a first (or only) data center 112 to identify a load balancing plan for of the application within the data center 112. Within the data center 112, the topology aware load balancing engine 106 can determine, for each server involved in supporting the application, links and capacities associated with the server.

The topology aware load balancing engine 106 can also compare application flow requirements to the available links. The topology aware load balancing engine 106 can perform this analysis for each available server (or other element) in the data center 112 that provides functionality associated with the application. Upon determining links and capacities for the servers in a data center 112 that provide functionality associated with the application, the topology aware load balancing engine 106 can minimize a utilization of one or more link associated with the application, in some embodiments, or minimize a total utilization of links associated with the application in some other embodiments. Thus, for example, if two links are available to provide a particular data communication associated with the application, the topology aware load balancing engine 106 can balance signaling associated with one or both links in a manner that will minimize the highest utilization of the highest-utilized link of those two links and/or the total utilization across both links.

By way of another example, two links A and B may exist in a data center 112. The link A may be 40% utilized by an application A. The link B, meanwhile, may be 55% utilized by an application A. In analyzing load balancing for an application B, which will use 15% of either of the links A, B, the topology aware load balancing engine 106 may determine that if the application B operates on the link A, the result will be a total utilization of 55%, which is less than a total utilization of the link B if the application B instead uses link B. This example is an extremely simple example of how load can be balanced for an application by selecting from different links and/or how such a selection can affect a total utilization. This example should not be construed as being limiting in any way.

According to various embodiments of the concepts and technologies described herein, the topology aware load balancing engine 106 can analyze the links associated with a data center 112 and/or application by beginning first with a heaviest utilized link. Thus, the topology aware load balancing engine 106 can select a highest loaded link, minimize traffic on that link while meeting application requirements, and then select a next highest link. In some embodiments, this process can be iterated until all links of the application and/or data center 112 have been minimized and as such, the total utilization of the links has been minimized. It should be understood that this example is illustrative and therefore should not be construed as being limiting in any way.

Thus, the topology aware load balancing engine 106 can determine how to balance loads across links associated with the data centers 112 such that a utilization of a highest-utilized link is minimized, in some embodiments, and/or such that a total utilization associated with all of the links of the data center 112 is minimized while still meeting application requirements. When the optimal load balancing scheme or plan is determined, the topology aware load balancing engine 106 can output one or more commands 120A-N (hereinafter collectively and/or generically referred to as "commands 120") to balance the application flows across the links associated with the determined load balancing plan. Thus, the topology aware load balancing engine 106 can minimize one or more link utilizations and/or capacities of a data center 112 to provide load balancing for an application. It should be understood that this example is illustrative and therefore should not be construed as being limiting in any way.

After determining the optimal load balancing plan, the topology aware load balancing engine 106 can also be configured to adjust and/or restrict the allocation plan for the application based upon load balancing. Thus, the topology aware load balancing engine 106 can again minimize one or more links associated with the application and re-distribute commands 120 to the data centers 112 to change signaling associated with the application and/or to adjust flows of data/traffic associated with the application in a manner that will minimize a link utilization of the data centers 112 while meeting requirements of the application. These and other aspects of the concepts and technologies described herein will be illustrated and described below in more detail.

FIG. 1 illustrates one server computer 102, one network 104, one requestor 110, two or more data centers 112, two or more resources 114, one resource monitor 118, and one data store 124. It should be understood, however, that various implementations of the operating environment 100 can include zero, one, or more than one server computer 102; zero, one, or more than one network 104; zero, one, or more than one requestor 110; zero, one, two, or more than two data centers 112; zero, one, two, or more than two resources 114; zero, one, or more than one resource monitors 118; and/or zero, one, or more than one data store 124. As such, the illustrated embodiment should be understood as being illustrative, and should not be construed as being limiting in any way.

Figure 2:
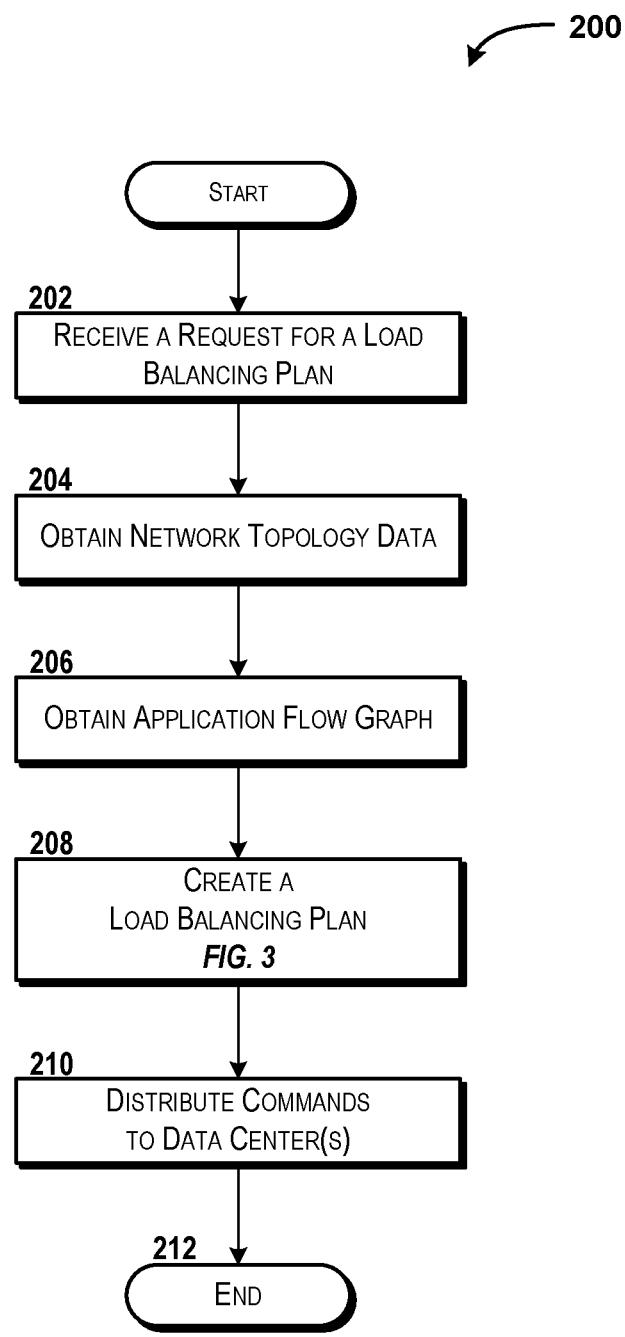
FIG. 2 is a flow diagram showing aspects of a method for creating a load balancing plan for an application, according to an illustrative embodiment of the concepts and technologies described herein.

Turning now to FIG. 2, aspects of a method 200 for creating a load balancing plan for an application will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the topology aware load balancing engine 106. It should be understood that additional and/or alternative devices and/or network nodes can provide the functionality described herein via execution of one or more modules, applications, and/or other software including, but not limited to, the topology aware load balancing engine 106. Thus, the illustrated embodiments are illustrative, and should not be viewed as being limiting in any way.

The method 200 begins at operation 202. At operation 202, the server computer 102 can receive a request for a load balancing plan. The request for the load balancing plan can be associated with an application. According to various embodiments of the concepts and technologies described herein, the request received in operation 202 can be similar to or even identical to the load balancing request 108 illustrated and described above with reference to FIG. 1. As such, it can be appreciated that the request received in operation 202 can be generated by a requestor such as the requestor 110, though this is not necessarily the case.

The request received in operation 202 can correspond to a service call (e.g., the topology aware load balancing engine 106 can operate as a callable service that can generate a load balancing plan on demand and/or on request of an application, function, or service); an explicit request (e.g., a user, application, or other entity can request generation of the load balancing plan); or other types of implicit and/or explicit requests. Regardless of how the request is made, the server computer 102 can determine, in operation 202, that load balancing for an application is requested, and therefore can determine to create a load balancing plan for the application as will be illustrated and described herein.

From operation 202, the method 200 proceeds to operation 204. At operation 204, the server computer 102 can obtain topology information relating to one or more data centers 112 and/or components thereof. Thus, in operation 204, the server computer 102 can obtain the network topology data 116 illustrated and described above with reference to FIG. 1, though this is not necessarily the case. As illustrated and described in detail above, the network topology data 116 can include element data, link data, availability data, location data, and/or other data and therefore can indicate, for one or more networks, data centers 112, and/or resources 114, availability, location, capacity, and/or capabilities of various elements and/or links.

Thus, the network topology data 116 can indicate, or be analyzed to determine, resources 114 that support the application for which load balancing is requested, capacities of the resources 114, geographical location(s) of the resources 114, ownership information for the resources 114, bandwidth capabilities of or associated with the resources 114, power information for the resources 114, and/or other information. It can be appreciated that the information obtained in operation 204 can include, but is not necessarily limited to, the various types of information illustrated and described above with reference to the network topology data 116 in FIG. 1. These and other types of information can be used to determine what resources 114 support the application and, as will be explained in more detail below, to identify a load balancing plan that results in an optimal (minimized) utilization of one or more links associated with the resources 114.

From operation 204, the method 200 proceeds to operation 206. At operation 206, the server computer 102 can obtain an application flow graph 122. In particular, the server computer 102 can identify the application for which load balancing was requested by way of the load balancing request 108 received in operation 202, and identify an application flow graph 122 associated with the application in operation 206. According to various embodiments of the concepts and technologies described herein, multiple application flow graphs 122 can be stored at a data storage device such as the data store 124. The application flow graphs 122 can be stored in a manner that associates a particular application flow graph 122 with an application. Thus, the server computer 102 can identify the application flow graph 122 based on the application name or other identifying information. It should be understood that this example is illustrative and therefore should not be construed as being limiting in any way.

From operation 206, the method 200 can proceed to operation 208. At operation 208, the server computer 102 can create a load balancing plan for the application. Additional details of creating the load balancing plan will be illustrated and described herein, particularly with reference to FIG. 3. Briefly, the server computer 102 can identify one or more data centers 112 that host the application and/or components of the application, analyze severs and/or other elements (resources 114) of the data centers 112, and determine an optimal load balancing scheme for the application.

More particularly, the server computer 102 can identify servers of the data centers 112, identify links and capacities of the servers, determine application flow requirements for the links, and minimize a capacity of a highest-utilized link of the links. In some embodiments, the server computer 102 can analyze the links to identify a highest-utilized link. The server computer 102 can then minimize traffic on that (highest-utilized) link. The server computer 102 also can, in some embodiments, move on to the next-highest-utilized link and repeat the minimization of utilization of the links until traffic across each link has been minimized. It should be understood that this example is illustrative and therefore should not be construed as being limiting in any way. Thus, the utilization of one or more of the links can be minimized by the server computer 102. The server computer 102 can generate one or more commands 120 for deploying the load balancing plan to the resources 114 and/or data centers 112. In various embodiments, the commands 120 can be sent to load balancing agents that can control signaling associated with the application so that the load balancing plan is realized. Additional details of this process will be illustrated and described in more detail below with reference to FIG. 3.

From operation 208, the method 200 can proceed to operation 210. At operation 210, the server computer 102 can distribute the one or more commands 120 to the data centers 112. The commands 120 can be generated in operation 208 and therefore can be directed to implementing the load balancing plan. It should be understood that in some embodiments, the server computer 102 can distribute commands 120 at other times, although this is not shown in FIG. 2.

From operation 210, the method 200 proceeds to operation 212. The method 200 can end at operation 212.

Although not illustrated separately in FIG. 2, the operation 208 also can include adjusting and/or restricting the load balancing plan associated with the application. Briefly, the server computer 102 can repeat operations 204-208 at any time to minimize total utilization of one or more links associated with the application. Thus, it should be understood that the operations 204-208 can be repeated any number of times before the commands 120 are distributed and/or that the operations 204-208 can be repeated after the commands 120 are distributed.

Figure 3:
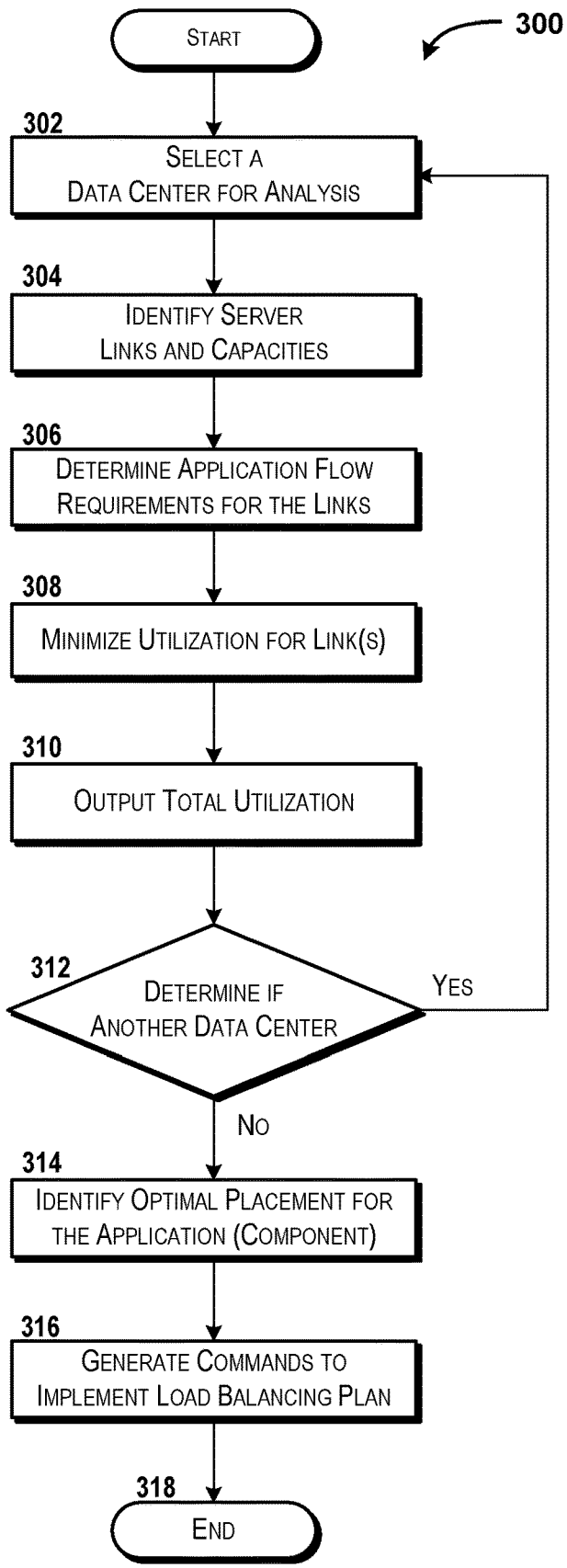
FIG. 3 is a flow diagram showing aspects of a method for creating a load balancing plan using a topology aware load balancing engine, according to an illustrative embodiment of the concepts and technologies described herein.

Turning now to FIG. 3, aspects of a method 300 for creating a load balancing plan will be described in detail, according to an illustrative embodiment. It should be understood that the functionality of the method 300 can be performed by the server computer 102 in association with performance of operation 208 in FIG. 2, though this is not necessarily the case as the method 300 can be performed at additional and/or alternative times.

The method 300 begins at operation 302. At operation 302, the server computer 102 can select a data center 112 for analysis. The selection of the data center 112 can be for purposes of analyzing the capabilities of links that host an application in the data center 112 in accordance with the concepts and technologies described herein. Thus, the data center 112 can be selected according to any criteria including, but not limited to, a first (or only) data center 112 that hosts the application, a random data center 112 that hosts the application, a data center 112 with a highest utilization, a data center 112 located at a particular location, combinations thereof, or the like. Because any criteria can be used to select the data center 112, the selection is not further described with respect to operation 302.

From operation 302, the method 300 proceeds to operation 304. At operation 304, the server computer 102 can identify server links for the data center 112 selected in operation 302. The server computer 102 also can determine capacities associated with the server links of the data center 112 selected in operation 302. In operation 304, the server computer 102 can determine capabilities and/or capacities associated with links to and from the servers in the data center 112 such as transmission bandwidth, rates, availability, and/or capacities; reception bandwidth, rates, availability, and/or capacities; combinations thereof; or the like. Thus, in operation 304, the server computer can determine the utilization of the server links that operate to provide functionality associated with the application. It should be understood that the identification of the capabilities and/or capacities associated with the server links can be made by the server computer 102 based upon the network topology data 116.

From operation 304, the method 300 proceeds to operation 306. At operation 306, the server computer 102 can determine one or more application flow requirements for the server links identified in operation 304. Thus, for example, the server computer 102 can determine that a particular link needed to provide functionality for the application has an application requirement of a particular transmission bandwidth, reception bandwidth, transmission rate, reception rate, combinations thereof, or the like. This determination can be based, at least in part, upon the application flow graph 122 as illustrated and described herein. Thus, in operation 306, the server computer 102 can determine, for a particular link, what is needed to provide the functionality of the application.

From operation 306, the method 300 proceeds to operation 308. At operation 308, the server computer 102 can minimize a utilization of one or more of the server links identified in operation 304. According to various embodiments of the concepts and technologies described herein, the server computer 102 can identify, as part of operation 308, a highest utilized link of the server links identified in operation 304, and minimize the utilization on that link in operation 308. In some other embodiments, the server computer 102 can, in operation 308, minimize the total capacity of the server links identified in operation 304 while meeting requirements for the application. According to yet other embodiments, the server computer 102 can identify a highest-utilized link in the data center 112, minimize traffic across that link, and then select a next-highest-utilized link in the data center 112. These operations can be repeated until a utilization of each of the links has been minimized by adjusting traffic and/or signaling across those links. Via these operations, the server computer 102 can minimize the total utilization of the links in a data center 112. In operation 308, the server computer 102 can use the capacity of a link (as determined in operation 304) and divide that capacity by the flow required for that link (as determined in operation 306), to determine a utilization of the link in operation 308, and then minimize this value by changing signaling and/or traffic flows among the various links that provide an application. Thus, the server computer 102 can minimize utilization of one or more of the links in a data center 112 by considering all links holistically and minimizing utilization. It should be understood that this example is illustrative and therefore should not be construed as being limiting in any way.

As noted above, the server computer 102 can perform the above-described calculation for each server link and/or application flow to identify a load balancing plan that will minimize total utilization of the server links by the application, or the server computer 102 can perform the above-described operations to minimize the highest-utilized link in the data center 112. From operation 308, the method 300 proceeds to operation 310. At operation 310, the server computer 102 can output the total utilization determined in operation 308. The total utilization can be output into a data file or data storage location for further use by the server computer 102 when determining the optimized load balancing plan for the application, as will be explained in more detail below.

From operation 310, the method 300 proceeds to operation 312. At operation 312, the server computer 102 can determine if another data center 112 exists for analysis. If so, the method 300 can return to operation 302, a next data center 112 (that hosts the application and/or a component thereof) can be selected, and the analysis of operations 304-312 can be repeated. The operations 304-312 can be repeated until the server computer 102 determines, in any iteration of operation 312, that no more data centers 112 exist for analysis. If the server computer 102 determines that no other data center 112 is to be analyzed (and/or that all data centers 112 have been analyzed), the method 300 can proceed to operation 314.

Thus, it can be appreciated that by performing operations 304-310 for each server in a data center 112 and/or each available server link associated with each of the servers, the server computer 102 can optimize load balancing for an application and/or application component at the data center 112. Furthermore, these operations can be repeated for multiple data centers 112 to optimize load balancing of the application in a network. It should be understood that this example is illustrative and therefore should not be construed as being limiting in any way.

From operation 312, the method 300 proceeds to operation 314. At operation 314, the server computer 102 can identify an optimal load balancing plan for the application and/or application component based upon the rate(s) determined in various iterations of the method 300. Thus, for example, the rates (determined in iterations of operation 310) can be compared and a load balancing plan that corresponds to the lowest rate (corresponding to the lowest total utilization of links in a data center 112) can be selected for use.

From operation 314, the method 300 can proceed to operation 316. At operation 316, the server computer 102 can generate one or more commands 120 to implement the load balancing plan identified in operation 314. Thus, the commands 120 generated in operation 314 can be generated to effect implementation of the load balancing plan for the application as determined in the method 300. The commands 120 can be deployed to one or more load balancing agents in the data centers 112 to effect balancing of traffic and/or communications between application components over the links in accordance with the above description of the method 300. It should be understood that this example is illustrative and therefore should not be construed as being limiting in any way.

From operation 316, the method 300 proceeds to operation 318. The method 300 ends at operation 318.

According to various embodiments of the concepts and technologies described herein, the data links considered in the methods 200-300 can be selected to only include data links that pass across racks and/or data centers 112. Thus, various embodiments of the concepts and technologies described herein can ignore server links that represent data communications between servers in the same rack as some embodiments aim to minimize communications between racks and/or data centers 112. Nonetheless, it should be understood that the communications between servers in a same rack can be considered as well, in some embodiments.

Also, some embodiments of the concepts and technologies described herein can be used to allow unbalanced loads across server links. Thus, while the above embodiments have been described as adjusting the application deployment based upon load balancing, it should be understood that his embodiment is illustrative of some embodiments and should not be construed as being limiting in any way.

Figure 4:
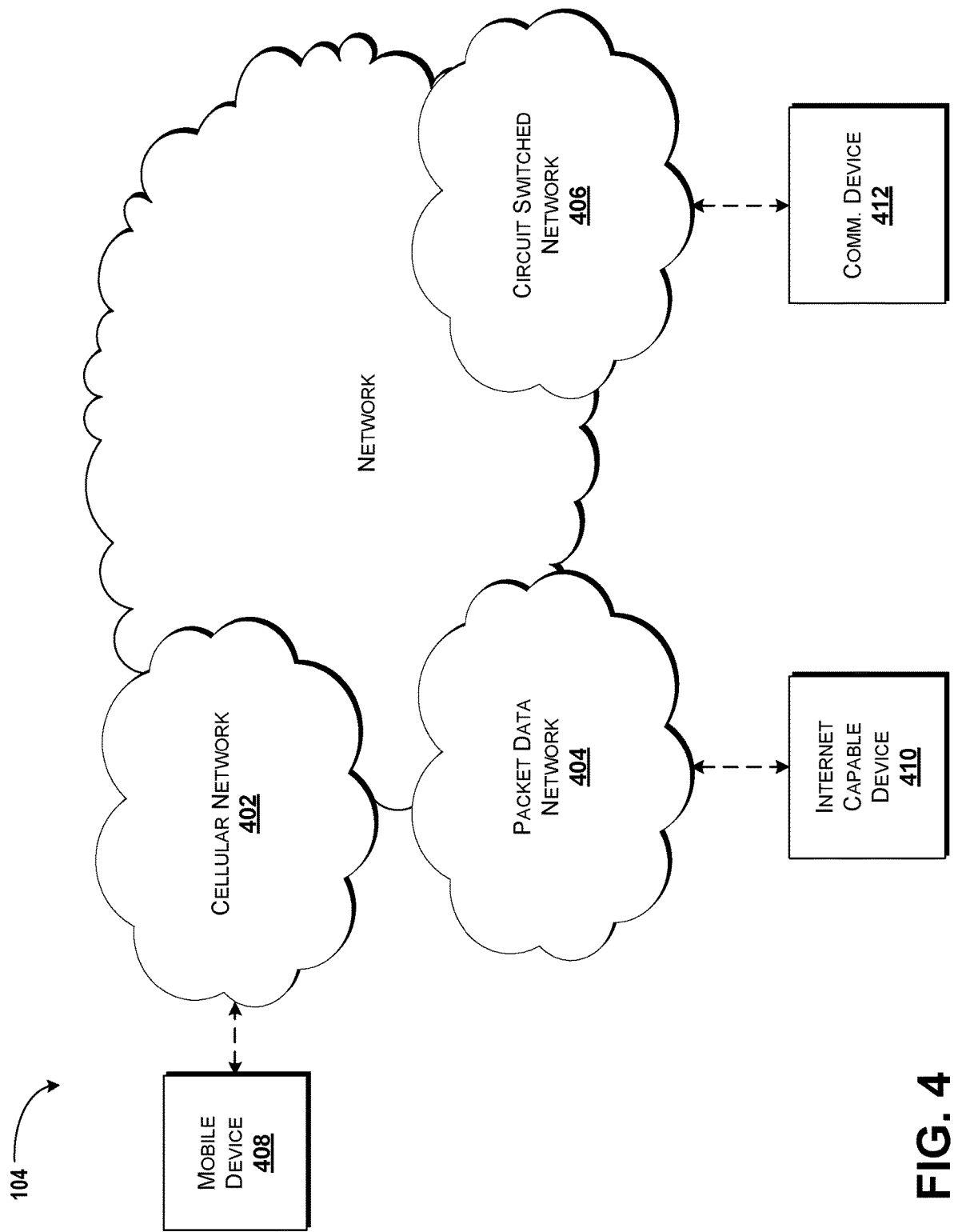
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
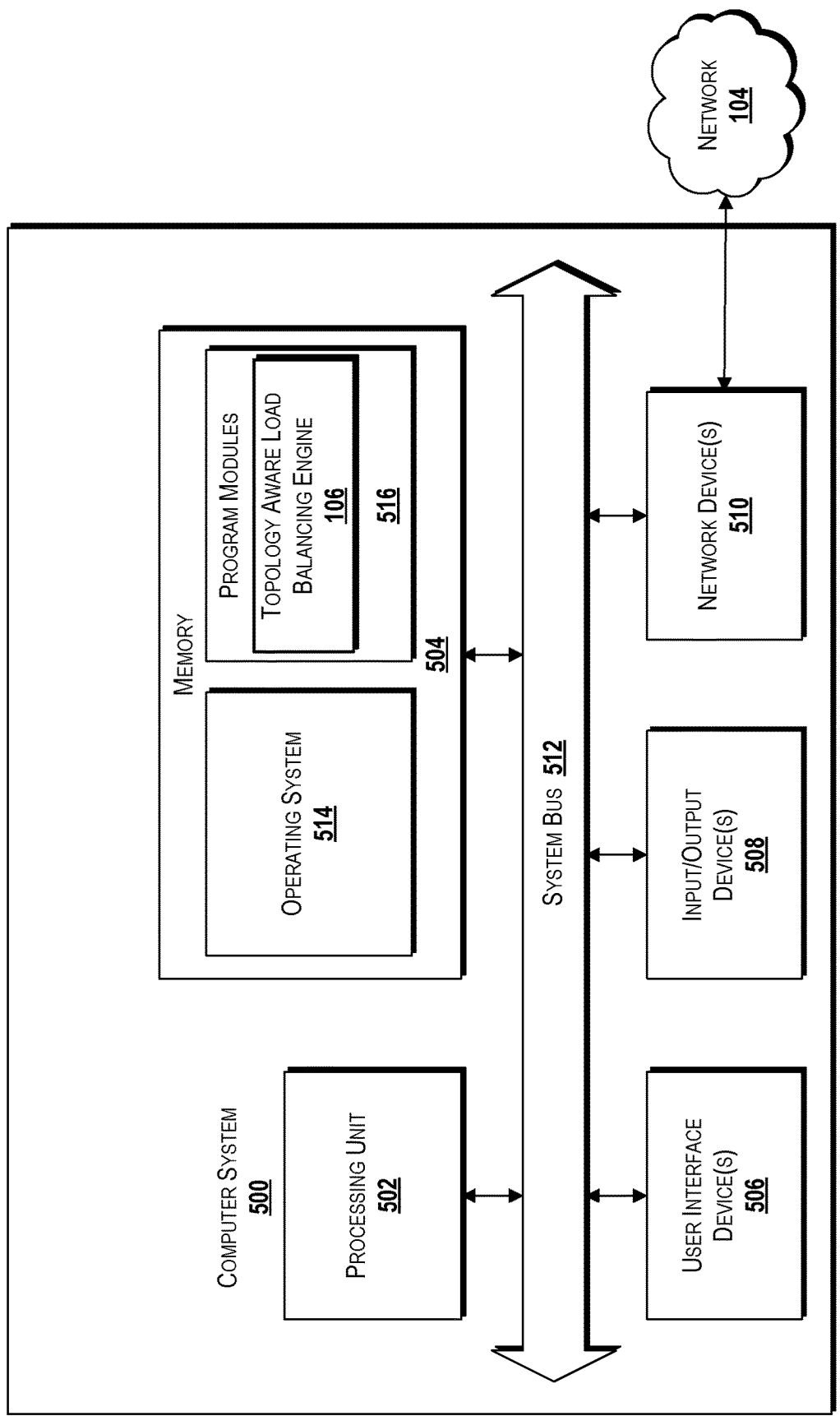
FIG. 5 is a block diagram illustrating an example computer system configured to provide a topology aware load balancing engine, according to some illustrative embodiments of the concepts and technologies described herein.

FIG. 5 is a block diagram illustrating a computer system 500 configured to provide the functionality described herein for providing and/or using a topology aware load balancing engine, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the topology aware load balancing engine 106. This and/or other programs can be embodied in computer-readable media containing instructions that, when executed by the processing unit 502, perform one or more of the methods 200, 300 described in detail above with respect to FIGS. 2-3. According to embodiments, the program modules 516 may be embodied in hardware, software, firmware, or any combination thereof. Although not shown in FIG. 5, it should be understood that the memory 504 also can be configured to store the load balancing request 108, the network topology data 116, the application flow graphs 122, the commands 120, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a topology aware load balancing engine have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
identifying, based on network topology data that describes elements of a data center, a plurality of server links associated with the data center,
identifying, based on an application flow graph associated with an application hosted by the data center, application flow requirements for the plurality of server links,
minimizing a capacity associated with a highest utilized server link of the plurality of server links while meeting the application flow requirements, and
creating, based on the capacity, a load balancing plan for the application.

2. The system of claim 1, wherein minimizing the capacity comprises:
setting a parameter that represents a utilization of the highest utilized server link of the plurality of server links; and
minimizing the parameter.

3. The system of claim 1, wherein the application flow graph comprises a data structure that represents:
hardware used to provide the application,
links associated with the application, and
link capacities associated with the links.

4. The system of claim 3, further comprising:
distributing commands to the data center, wherein the commands instruct the data center to balance traffic over the links.

5. The system of claim 1, wherein the network topology data comprises:
location data that identifies a location of a server associated with the data center;
an availability associated with the server associated with the data center; and
a capacity of the server associated with the data center.

6. The system of claim 1, wherein the network topology data comprises:
location data that identifies locations associated with the plurality of server links; and
availabilities associated with the plurality of server links.

7. The system of claim 1, wherein creating the load balancing plan comprises balancing a volume of requests associated with the data center across multiple tiers of the data center.

8. A method comprising:
identifying, by a processor and based on network topology data that describes elements of a data center, a plurality of server links associated with the data center;
identifying, by the processor and based on an application flow graph associated with an application hosted by the data center, application flow requirements for the plurality of server links;
minimizing, by the processor, a capacity associated with a highest utilized server link of the plurality of server links while meeting the application flow requirements; and
creating, by the processor and based on the capacity, a load balancing plan for the application.

9. The method of claim 8, wherein minimizing the capacity comprises:

setting a parameter that represents a utilization of the highest utilized server link of the plurality of server links; and minimizing the parameter.

10. The method of claim 8, wherein the application flow graph comprises a data structure that represents hardware used to provide the application, links associated with the application, and link capacities associated with the links.

11. The method of claim 10, further comprising:

distributing commands to the data center, wherein the commands instruct the data center to balance traffic over the links.

12. The method of claim 8, wherein the network topology data comprises:

location data that identifies a location of a server associated with the data center;

an availability associated with the server associated with the data center; and a capacity of the server associated with the data center.

13. The method of claim 8, wherein the network topology data comprises:

location data that identifies locations associated with the plurality of server links; and availabilities associated with the plurality of server links.

14. The method of claim 8, wherein creating the load balancing plan comprises balancing a volume of requests associated with the data center across multiple tiers of the data center.

15. A computer storage medium having computer-executable instructions stored thereon that, when executed by a processor, cause the processor to perform operations comprising:

identifying, based on network topology data that describes elements of a data center, a plurality of server links associated with the data center;

identifying, based on an application flow graph associated with an application hosted by the data center, application flow requirements for the plurality of server links;

minimizing a capacity associated with a highest utilized server link of the plurality of server links while meeting the application flow requirements; and creating, based on the capacity, a load balancing plan for the application.

16. The computer storage medium of claim 15, wherein minimizing the capacity comprises:

setting a parameter that represents a utilization of the highest utilized server link of the plurality of server links; and minimizing the parameter.

17. The computer storage medium of claim 15, wherein the application flow graph comprises a data structure that represents:

hardware used to provide the application, links associated with the application, and link capacities associated with the links.

18. The computer storage medium of claim 15, wherein the network topology data comprises:

location data that identifies a location of a server associated with the data center;

an availability associated with the server associated with the data center; and a capacity of the server associated with the data center.

19. The computer storage medium of claim 15, wherein the network topology data comprises:

location data that identifies locations associated with the plurality of server links; and availabilities associated with the plurality of server links.

20. The computer storage medium of claim 15, wherein creating the load balancing plan comprises balancing a volume of requests associated with the data center across multiple tiers of the data center.

\* \* \* \* \*